(No Model.)
J. M. CHATFIELD.
FOUNDER'S TRUCK.
No. 468,559.
2 Sheets—Sheet 1.
Patented Feb. 9, 1892.
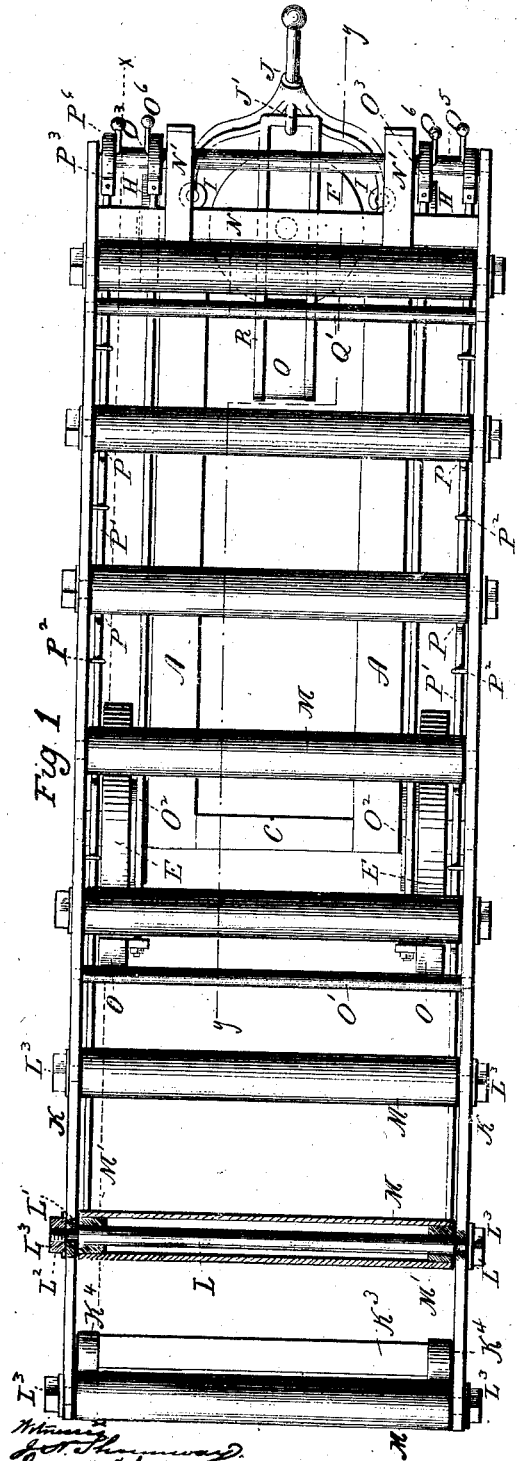
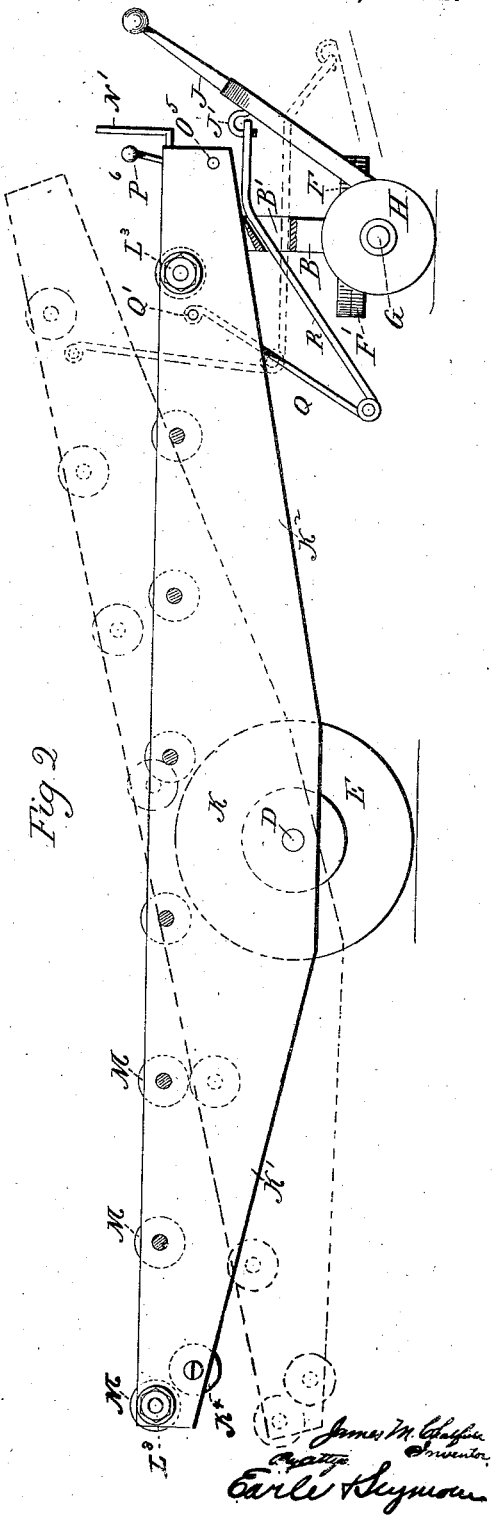

(No Model.) 2 Sheets—Sheet 2.
J. M. CHATFIELD.
FOUNDER'S TRUCK.
No. 468,559. Patented Feb. 9, 1892.
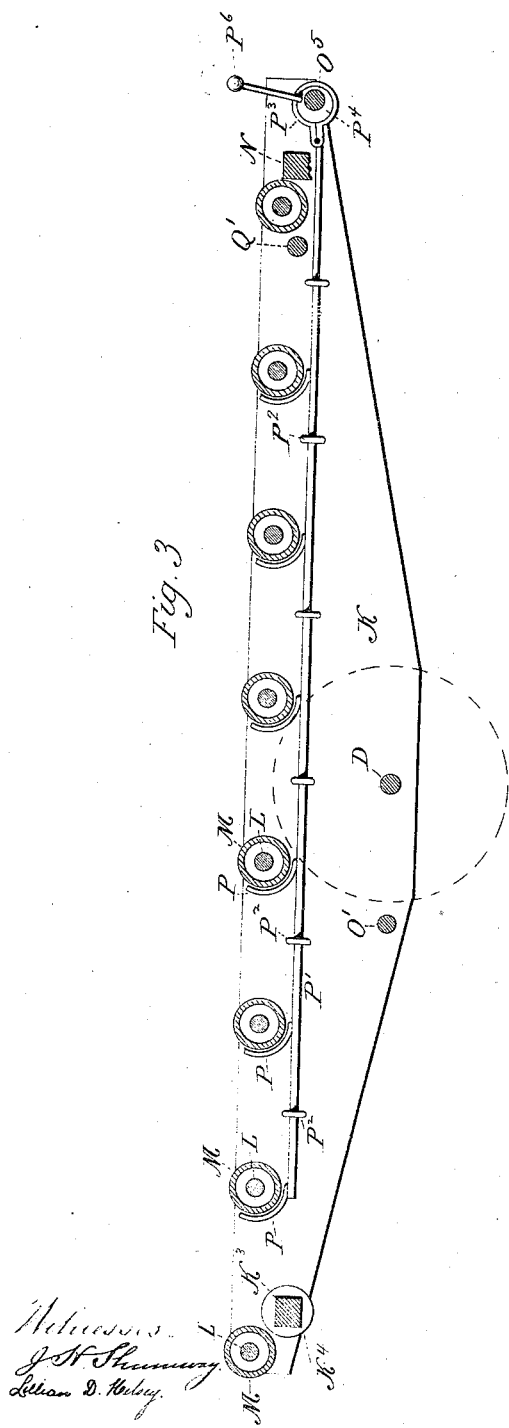
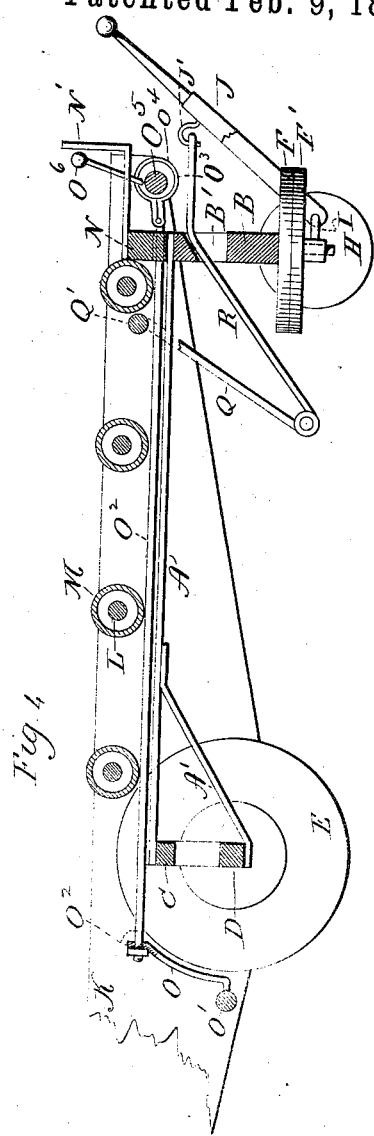

UNITED STATES PATENT OFFICE.

JAMES M. CHATFIELD, OF THOMASTON, CONNECTICUT.

FOUNDER'S TRUCK.

SPECIFICATION forming part of Letters Patent No. 468,559, dated February 9, 1892.

Application filed March 2, 1891. Serial No. 383,423. (No model.)

*To all whom it may concern:*

Be it known that I, JAMES M. CHATFIELD, of Thomaston, in the county of Litchfield and State of Connecticut, have invented a new Improvement in Founders' Trucks; and I do hereby declare the following, when taken in connection with accompanying drawings and the letters of reference marked thereon, to be a full, clear, and exact description of the same, and which said drawings constitute part of this specification, and represent, in—

Figure 1, a plan view of a founder's truck constructed in accordance with my invention; Fig. 2, a view thereof in side elevation, the tilting frame of the truck being shown in its tilted position by broken lines; Fig. 3, a view of the device in vertical longitudinal section on the line $x\,x$ of Fig. 1; Fig. 4, a similar view, partly in section and partly in elevation, on the line $y\,y$ of the same figure.

My invention relates to an improvement in founders' trucks, the object being to produce a simple, inexpensive, light, durable, and convenient carriage for receiving metal directly from a muffle and distributing it to any convenient place on the foundry-floor.

With these ends in view my invention consists in a founder's truck having certain details of construction and combinations of parts as will be hereinafter described, and pointed out in the claims.

As herein shown, the device has a short low truck-frame consisting, essentially, of two parallel metal bars A A, having braces A' A', and secured at their forward ends to the upper edge of a bolster B and at their rear ends to a frame C, resting upon the rear axle D, which carries the rear truck-wheels E E. The lower edge of the bolster B has the upper member F of a fifth-wheel secured to it, the corresponding lower member F' of the fifth-wheel being secured to the forward axle G of the truck. The said axle is provided with small wheels H H and furnished with two hooks I I, to which the neap J is attached, the said neap being provided upon its upper face and about midway of its length with a hook J', the function of which will be mentioned later on. It will be noticed that the forward truck-wheels H H are adapted in size to turn readily under the forward end of the truck-frame. The tilting frame which receives the metal is made nearly twice the length of the said truck-frame and composed of two heavy side pieces K K, preferably made of plate or cast metal and having straight upper and beveled lower edges. These side pieces are swiveled upon the outer ends of the rear axle D at a point just to the rear of their longitudinal centers, so that the action of gravity tends to bring the frame into its normal position, in which its forward end is supported upon the forward end of the truck-frame, the tilting frame being thus hung about midway of its length. The two side pieces K K are rigidly secured together by means of a series of stout rods L, arranged parallel with each other, and extending transversely between and through the side pieces and having their ends shouldered, as at L', to bear upon the inner faces thereof, and reduced and threaded, as at $L^2$, to receive nuts $L^3$, which are screwed against the outer face of the side pieces to firmly bind the same together. Each of the said rods L is provided with an anti-friction carrying-roller, consisting of a tube or pipe M, having each of its ends furnished with a plug M', constructed with a central perforation made a little larger in diameter than the diameter of the rods L, so as to permit the roller to revolve freely thereupon. The said rods are mounted near the upper edges of the side pieces, and the rollers are adapted in diameter to project above the said edges, and so that the load carried by the tilting frame, whether in a tray or not, will be cleared from the edges of the side pieces. A heavy bar N, rigidly secured between the forward ends of said side pieces at a point a little below the lower edge of the forward anti-friction roller, supports the tilting frame upon the forward edge of the truck-frame and prevents the rollers from engaging therewith. This bar is provided with two fenders N' N', which, as herein shown, have the form of angle-plates and stand above the forward roller, so as to prevent the load from being drawn too far forward on the tilting frame.

In order to prevent the device from moving when it is backed up to the door of a muffle preparatory to being loaded provision is made for applying brakes to the rear wheels of its truck-frame. As herein shown, these brakes consist of two shoes O O, arranged for engagement with the wheels E E, secured at their lower ends to a rock-shaft O', journaled between the said side pieces K K, near the lower edges thereof, and respectively attached at their upper ends to independent adjustable rods $O^2$ $O^2$, the forward ends of which are furnished with eccentric-straps $O^3$ $O^3$, encircling eccentrics $O^4$ $O^4$, loosely mounted upon a brake-shaft $O^5$, journaled between the extreme forward ends of the side pieces K K. Each of the said eccentrics is furnished with a brake-lever $O^6$, whereby the eccentrics are automatically or manually operated to apply or let off the brakes. The said levers are connected with the eccentrics so that when the brake-shoes are clamped against the truck-wheels the levers will stand up and therefore in position to be engaged and thrown forward to disengage the brake-shoes from the wheels by the engagement with them of the forward end of the tray on which the metal is loaded just before the said tray is brought to its final position on the truck, in which it engages with the fenders N' N'. In this way are the brake-shoes automatically disengaged from the truck-wheels. The rotation of the anti-friction rollers M permits the tray to be readily drawn to its place; but as soon as that has been done all of the rollers are locked against rotation to prevent the tray from slipping off from the tilting frame when the founder's truck passes over inequalities or inclinations in the floor of the foundry or is stopped on an incline.

As herein shown, provision is made for locking the anti-friction rollers by means of a series of brake-shoes P, all secured to a long brake-rod P', arranged to reciprocate horizontally in suitable bearings $P^2$, attached in a horizontal series to the inner face of one of the side pieces K, the forward end of the brake-rod P being provided with an eccentric-strap $P^3$, encircling an eccentric $P^4$, loosely mounted upon the adjacent end of the brake-shaft $O^5$ and provided with a brake-lever or manual $P^6$, by means of which the eccentric is operated in simultaneously engaging all of the shoes on the rod P' with the rollers or disengaging them therefrom. The lever $P^6$ is preferably arranged on its eccentric so that when the brake-shoes are disengaged from the rollers the lever will stand in an approximately vertical position, from which it is thrown forward to engage the said shoes with the rollers. If the lever $P^6$ is arranged as thus described in relation to the levers $O^6$ $O^6$, it will be automatically operated to lock the rollers at the right time by the tray just before the same engages with the fenders. This arrangement of the levers is not arbitrary, but will be found convenient and not interfering with their independent manual operation when desired. The eccentrics $O^4$ $O^4$ and $P^4$ being thus loosely mounted upon the shaft $O^5$, the mechanism for braking the wheels of the rear truck and the anti-friction rollers may be used independently or together, according to the dictations of circumstances. Inasmuch as the tilting frame is pivoted to the rear of its longitudinal center, the action of gravity will tend to keep it in a horizontal position, and this tendency will be reinforced by the load.

In order to tilt the frame for discharging its load, I provide a tilting mechanism, consisting of two links Q and R, the former being attached at its upper end to a rocking shaft Q', journaled between the side pieces K K of the tilting frame and at its lower end to the link R, the respective sides of which pass through openings B', formed in the bolster B of the forward truck, the extreme forward end of the said link R being adapted to be engaged by the hook J', which, as before mentioned, is carried by the neap J. By lifting the neap, as shown by Fig. 4 of the drawings, and engaging its hook with the forward end of the link R, an excellent leverage is secured for operating the links, as indicated by broken lines in Fig. 2, in tilting the frame into the position shown by broken lines in the same figure. The beveling of the lower edges of the side pieces, as at K' K', permits the said tilting frame to have its rear end carried down near to the floor, while the beveling of its forward edges, as at $K^2$ $K^2$, permits the truck-wheels of the forward axle to be turned freely under it when it is in its horizontal position.

To prevent the rear end of the tilting frame from biting into the foundry-floor when in its tilted position, it is provided with a roller-shaft $K^3$, extending between the rear extremities of its side pieces K K. Small rollers $K^4$ $K^4$, mounted on the ends of the shaft, run upon the floor and prevent the frame from directly engaging therewith.

In using my improved founder's truck it is backed up to the door of a muffle and its braking mechanism manually operated to lock the rear wheels of its truck-frame and unlock all of its anti-friction rollers. The tray containing the metal is then drawn out upon the tilting frame and over the rollers thereof until the forward end of the tray has been engaged with the brake-levers $O^6$ $O^6$ and $P^6$ and thrown them forward, whereby the brake-shoes O O are disengaged from the said wheels and the brake-shoes P engaged with the anti-friction rollers. The truck is then rolled away to the place where it is desired to deposit the tray. This reached, the brake-levers $O^6$ $O^6$ are manually thrown into their vertical positions, whereby the rear truck-wheels are again locked and the brake-lever $P^6$ lifted and the anti-friction rollers unlocked. The neap is then lifted and its hook engaged with the forward link of the tilting mechanism, and then depressed, whereby the tilting frame is tilted, so that the tray containing the metal will slide off. As soon as the tray has been discharged, the tilting frame will resume its normal or horizontal position by reason of its forward end being heavier than its rear end, as before explained.

I would have it understood that I do not limit myself to the construction and arrangement of parts herein shown and described, but hold myself at liberty to make such changes and alterations as fairly fall within the spirit and scope of my invention.

Having fully described my invention, what I claim as new, and desire to secure by Letters Patent, is—

1. In a founder's truck, the combination, with a short truck-frame mounted on a pair of forward and a pair of rear truck-wheels, the former being adapted to be turned horizontally under it, of a long tilting frame hung about midway of its length at or near the said rear truck-wheels and provided with a series of carrying-rollers projecting above its upper edges, and lever mechanism connecting the forward ends of the two frames, but constructed to permit the tilting frame to be tilted into its discharging position without disturbing the truck-frame, substantially as set forth, and whereby the tilting frame has a simple tilting or rocking action upon the truck-frame.

2. In a founder's truck, the combination, with a short truck-frame mounted on a pair of forward and a pair of rear truck-wheels, the former being adapted to be turned horizontally under it, of a long tilting frame hung about midway of its length at or near the said rear truck-wheels and provided with a series of carrying-rollers projecting above its upper edges, a neap connected with the forward truck-wheels, and two links respectively connected to the forward end of the tilting frame and adapted to be engaged by the neap, but constructed to permit the elevation of the forward end of the tilting frame without disturbing the truck-frame, substantially as set forth, and whereby the tilting frame has a simple tilting or rocking action upon the truck-frame.

3. In a founder's truck, the combination, with a short truck-frame mounted on a pair of forward and a pair of rear truck-wheels, of a long tilting frame hung about midway of its length at or near the said rear truck-wheels and provided with a series of carrying-rollers, a link pivotally connected at one end with the forward end of said tilting frame, a link connected at its inner end with the link mentioned and extending forward through bearings forming a part of the truck-frame, and a neap connected with the forward pair of truck-wheels and provided with a hook, substantially as set forth, and whereby the said tilting frame may be tilted by lifting the neap and engaging its hook with the forward link and then depressing the neap, substantially as described.

4. In a founder's truck, the combination, with a short truck-frame mounted on a pair of forward and a pair of rear truck-wheels, of a long tilting frame hung about midway of its length at or near the said rear truck-wheels and having two side pieces, a series of parallel stay-rods having their ends shouldered and threaded extending laterally between and projecting through the said side pieces and located near their upper edges, a series of tubes plugged at each end mounted upon the respective stay-rods, extending slightly above the said upper edges of the side pieces and forming carrying-rollers, and nuts bearing against the outer faces of the said side pieces and applied to the projecting threaded ends of the stay-rods, the shoulders whereof abut against the inner faces of the side pieces, substantially as set forth.

5. In a founder's truck, the combination, with a short truck-frame mounted on a pair of forward and a pair of rear truck-wheels, of a long tilting frame hung about midway of its length at or near the said rear truck-wheels and having a series of carrying-rollers extending slightly above the upper edges of its side pieces, lever mechanism connecting the forward ends of the tilting and truck frames, independent brake mechanisms for the truck-frame and the said carrying-rollers, and fenders located at the forward ends of the said tilting frame and standing above the level of the said rollers, substantially as described.

6. In a founder's truck, the combination, with a truck-frame, of a tilting frame having a series of anti-friction rollers extending slightly above the edges of its side pieces, and brake mechanism applied to the said tilting frame adapted to lock the rear wheels of the truck-frame and constructed to be operated from the forward end of the tilting frame, substantially as described.

7. In a founder's truck, the combination, with the truck-frame, of a tilting frame, and brake mechanism mounted in the said tilting frame and adapted to lock the rear wheels of the truck-frame, and including a brake-shaft journaled in the forward end of the tilting frame and provided with a brake-lever arranged to stand up when the said wheels are locked, substantially as set forth, and whereby the said lever is thrown forward for automatically unlocking the said wheels by the engagement of the tray containing the metal with the said lever.

8. In a founder's truck, the combination, with a truck-frame, of a tilting frame having a series of anti-friction rollers upon which the metal is loaded, brake mechanism mounted in the tilting frame and including a brake-shoe for each roller, and means located at the forward end of the said frame for simultaneously moving all of the shoes, substantially as described.

9. In a founder's truck, the combination, with a truck-frame provided with rear and forward truck-wheels, of a tilting frame having a series of anti-friction rollers to receive the load, and brake mechanisms mounted in the said tilting frame for the rear brake-wheels and the said anti-friction rollers, the said mechanisms being constructed and arranged to be used independently or together, substantially as described.

10. In a founder's truck, the combination, with a short truck-frame mounted on a pair of rear and a pair of forward truck-wheels, of a long tilting frame hung about midway of its length at or near the said rear truck-wheels and having two side pieces and a series of carrying-rollers extending above the upper edges thereof, the lower edges of the said side pieces being oppositely beveled toward their longitudinal centers, substantially as set forth.

In testimony whereof I have signed this specification in the presence of two subscribing witnesses.

JAMES M. CHATFIELD.

Witnesses:
EDW. C. STOUGHTON,
J. S. EASTWOOD.